C. P. KUEHN.
REEL FOR ELASTIC TAPE, RIBBON, OR LIKE MATERIAL.
APPLICATION FILED AUG. 2, 1915.
1,177,636.
Patented Apr. 4, 1916.
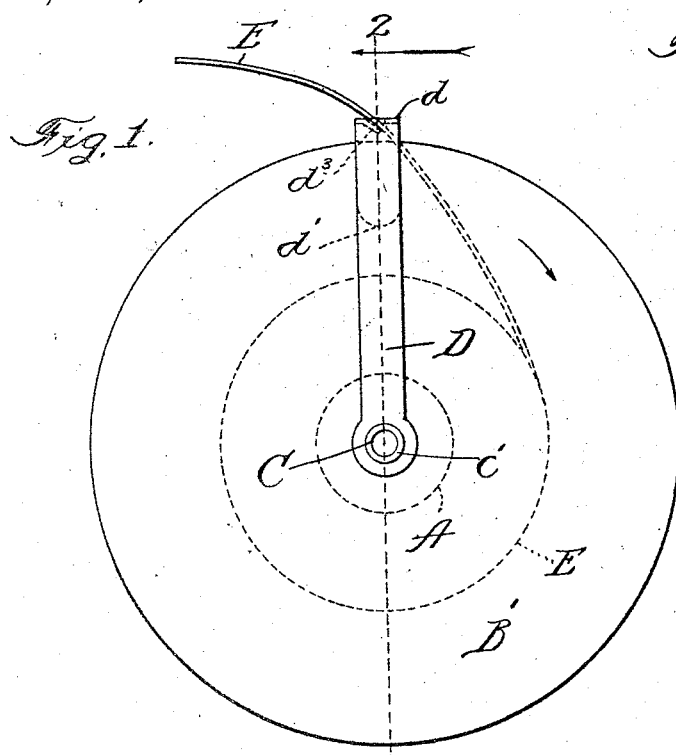
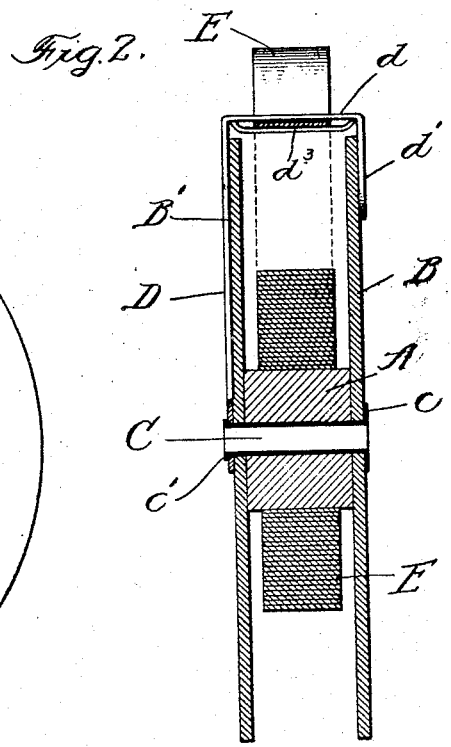
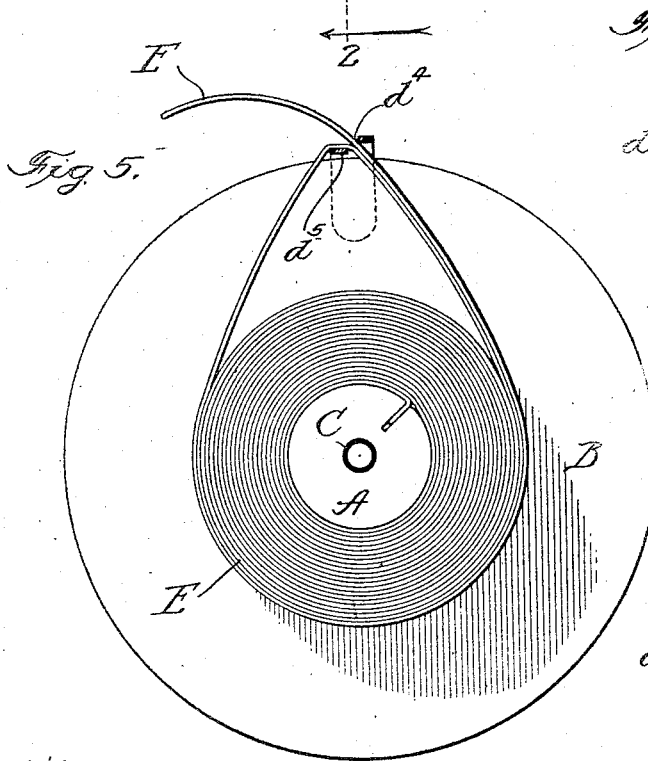
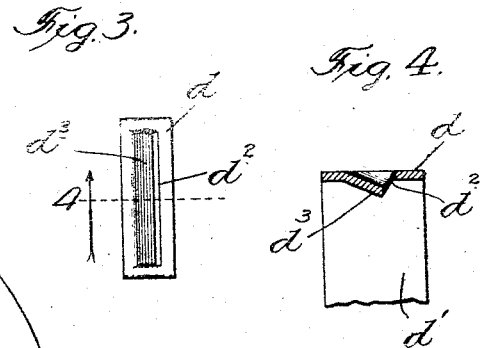
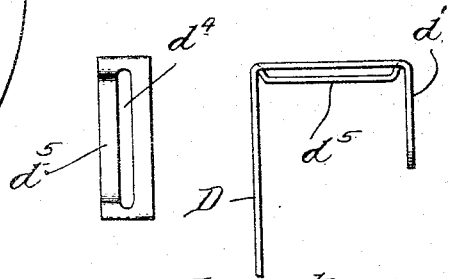
Witnesses:
Inventor:
Charles P. Kuehn
By Penn, Fisher & Clapp
Attys.

UNITED STATES PATENT OFFICE.

CHARLES P. KUEHN, OF CHICAGO, ILLINOIS, ASSIGNOR TO A. STEIN & COMPANY, OF CHICAGO, ILLINOIS, A CORPORATION.

REEL FOR ELASTIC TAPE, RIBBON, OR LIKE MATERIAL.

1,177,636.  Specification of Letters Patent.  Patented Apr. 4, 1916.

Application filed August 2, 1915. Serial No. 43,217.

*To all whom it may concern:*

Be it known that I, CHARLES P. KUEHN, a citizen of the United States, residing at Chicago, in the county of Cook and State of Illinois, have invented certain new and useful Improvements in Reels for Elastic Tape, Ribbon, or like Material, of which I do declare the following to be a full, clear, and exact description, reference being had to the accompanying drawing, forming a part of this specification.

Figure 1 is a view in side elevation of a reel embodying my invention. Fig. 2 is a view in vertical section on line 2—2 of Fig. 1. Fig. 3 is a detail plan view of the winding arm of the reel. Fig. 4 is a view in cross section on line 4—4 of Fig. 3. Fig. 5 is a view in central longitudinal section through the reel showing the manner of winding the elastic thereon and showing a modified form of winding arm. Fig. 6 is a detail plan view of the winding arm shown in Fig. 5. Fig. 7 is a detail front view of a portion of the winding arm shown in Figs. 5 and 6.

The present invention has for its object to provide an improved construction of reel or spool such as is commonly used for containing strips of elastic fabric, ribbons, tape or the like, and the object of the invention is to provide a simple form of reel that will enable the strip to be easily withdrawn from the reel and be readily rewound thereon. In the use of this class of reels it is customary for salesmen to withdraw or unwind from the reel as much of the elastic strip or ribbon as may be called for by the customer, but in doing this more of the elastic or ribbon is usually drawn from the reel than is actually required so that it is desirable to provide the reel with suitable means whereby the elastic strip or ribbon may be conveniently rewound, and it is also desirable that the free end of the ribbon may be so held that it can be conveniently caught by the fingers of the salesmen when it is to be withdrawn. With ordinary reels, it is found in practice that after a considerable amount of the elastic strip or ribbon has been withdrawn, it is a matter of considerable inconvenience, particularly if the strip or ribbon be very narrow, for the salesman to readily grasp the free end of the strip, and it is also found that where no provision is made for engaging the free end of the strip, there is danger of a considerable portion of the strip becoming unwound from the reel and exposed and soiled, and my invention provides simple and effective means whereby the objections to such prior constructions of reels are entirely overcome.

A designates a central spool or block of wood on each side of which are mounted the disks B and B', formed preferably of cardboard. Through the wooden spool or block A loosely passes a metal tube C, one end of which is formed with a broad flange $c$ to retain the disks B and B' in position. On the opposite end of the tube C is revolubly mounted the winding arm D that is held in position on the tube C by upsetting or riveting over the end of the tube C, as at $c'$. The arm D is preferably formed of a comparatively thin strip of brass or like material and is perforated for the free passage therethrough of the end of the metal tube C. The winding arm D is formed with a crown $d$ extending across the peripheries of the disks B, B', the free end of the winding arm D being bent downwardly, as at $d'$. The crown of the arm D is formed with a slot $d^2$ through which the strip or elastic fabric or ribbon E will be passed.

The slot $d^2$ in the crown of the arm D is preferably formed by depressing, as at $d^3$, the portion of metal forming the crown $d$. The depressed portion of the metal $d^3$ enables the free end of the elastic strip E to be readily threaded through the crown of the winding arm. The winding arm D turns freely with respect to the disks B, B', and these disks may also turn upon the central tube C.

When the elastic strip is to be withdrawn from the reel, the salesman can grasp the disks B, B', and pull off as much of the strip as he desires, and after having measured and cut off the desired length of strip, he can rewind the excess that has been withdrawn by holding the winding arm D and turning the disks B, B' in the direction of the arrow, Fig. 1. Inasmuch as the strip E passes through the slot $d^2$ in the crown of the winding arm D, the free end of the strip is normally held in position to be readily caught by the fingers until the strip has been completely withdrawn from the reel.

Instead of forming the crown of the winding arm D, as shown in Figs. 1 and 4 of the drawing, the crown of the winding arm may be formed by simply cutting out a slot $d^4$ in the crown and depressing, as at $d^5$, a portion of the crown. So, also, instead of passing the free end of the elastic strip or ribbon E through the slotted crown of the winding arm, as shown in Fig. 1, the strip may be passed twice through the slotted crown of the winding arm, as shown in Fig. 5. By this means, a greater frictional engagement between the strip C and the winding arm is secured so that all danger of the slipping of the free end of the strip through the crown of the winding arm is avoided.

It is obvious that the precise details of the invention above described may be varied without departing from the invention. Thus, while I have shown the winding arm D as connected to one end only of the hub C, this is obviously not essential, although I prefer to terminate the winding arm adjacent the periphery of the disk B, as a saving of metal is thereby effected.

Having thus described my invention, what I claim as new and desire to secure by Letters Patent is—

1. A reel of the character described, comprising a central hub, disks mounted at the ends of said hub, said hub being revoluble with respect to said disks, and a winding arm revolubly mounted with respect to said disks and extending from the center across the periphery of said disks, the portion of said winding arm extending between the peripheries of said disks being provided with a slot to receive a strip wound upon the hub.

2. A reel of the character described, comprising a central hub, disks mounted at the ends of said hub and revoluble with respect thereto, a spindle extending through said hub, and a winding arm mounted upon said spindle and revoluble with respect to said disks, said winding arm having a crown extending across the periphery of said disks.

3. A reel of the character described, comprising a central spool or hub, disks mounted at the end of said spool or hub, and a winding arm revolubly mounted with respect to said disks and extending from the center across the periphery of said disks, a portion of said winding arm extending between the peripheries of said disks being formed with a transverse slot, one wall of said slot being nearer the center of the reel than the other wall of said slot.

4. A reel of the character described, comprising a perforated central hub, disks mounted at the ends of said hub, a tube or spindle extending through said hub and having flanges at its ends, and a winding arm mounted on one end of said tube or spindle and revoluble with respect to said disks, said winding arm having a crown extending across the periphery of said disks and provided with an inwardly turned end.

5. A reel of the character described, comprising a perforated central hub, disks mounted at the ends of said hub, a spindle extending through said hub and having flanges at its ends, and a winding arm having a perforated end mounted upon one end of said spindle and revoluble with respect to said disks, said winding arm extending across the periphery of said disks.

CHARLES P. KUEHN.